Oct. 12, 1954 J. M. GARDNER 2,691,725

PRETUNING AND AUTOMATIC STATION SELECTING DEVICE

Filed May 12, 1950 3 Sheets-Sheet 1

INVENTOR.
JAMES M. GARDNER
BY
Christian R. Nielsen
ATTORNEY.

Oct. 12, 1954 J. M. GARDNER 2,691,725

PRETUNING AND AUTOMATIC STATION SELECTING DEVICE

Filed May 12, 1950 3 Sheets-Sheet 2

INVENTOR.
JAMES M. GARDNER
BY
Christian R. Nielsen
ATTORNEY.

PRETUNING AND AUTOMATIC STATION SELECTING DEVICE

Filed May 12, 1950 3 Sheets-Sheet 3

INVENTOR.
JAMES M. GARDNER
BY
Christian D. Nielsen
ATTORNEY.

Patented Oct. 12, 1954 2,691,725

UNITED STATES PATENT OFFICE 2,691,725

PRETUNING AND AUTOMATIC STATION SELECTING DEVICE

James M. Gardner, Milwaukee, Wis.

Application May 12, 1950, Serial No. 161,608

3 Claims. (Cl. 250—20)

This invention relates to improvements in radio and television apparatus and more particularly to means for a pretuning automatic station selector.

It is an object of this invention to provide a radio or television apparatus with timing and switch elements employed in combination with a station selector device, whereby a number of stations may be selected and through the functioning of the timing mechanism and switch elements, each station will be received in order, and after a predetermined time interval.

It is another object of this invention to provide means acting automatically whereby after an operator has selected in order various radio stations, the reception from each station may be received at predetermined time intervals, and without additional station selection on the part of the operator.

The prime purpose of this invention is to provide the usual radio or television panel with a plurality of station selectors, each selector comprising a number of various wave bands adjusted for radio or television reception from sending stations, whereby an operator may select one each of the stations on each of the station selectors and through the medium of a timing device and a new and improved relay delay switch, enable an operator to enjoy the benefits for a time interval from each of the stations in order without further manipulation for tuning the stations on the part of the operator. More specifically stated, the operator may enjoy the reception from preselected stations at set time intervals, through automatic breaking and contacting of a plurality of switches acting upon the different station selectors all regulated through time intervals as determined by a timing mechanism.

A still further object of the invention is to provide a device for automatically closing a plurality of control circuits one at a time at pre-selected times, which is simple in construction and easy to adjust so that the proper desired sequence of operations will be produced, whereby the invention as a whole may be manufactured at a relatively economical cost.

With the foregoing and other objects in view, all of which will be apparent as the description proceeds, the invention consists in a novel construction and relation of parts and electrical connections, a preferred embodiment of which is shown in the accompanying drawings, and the novel features of which are pointed out in the claims appended to and forming a part of the specification.

Figure 1:
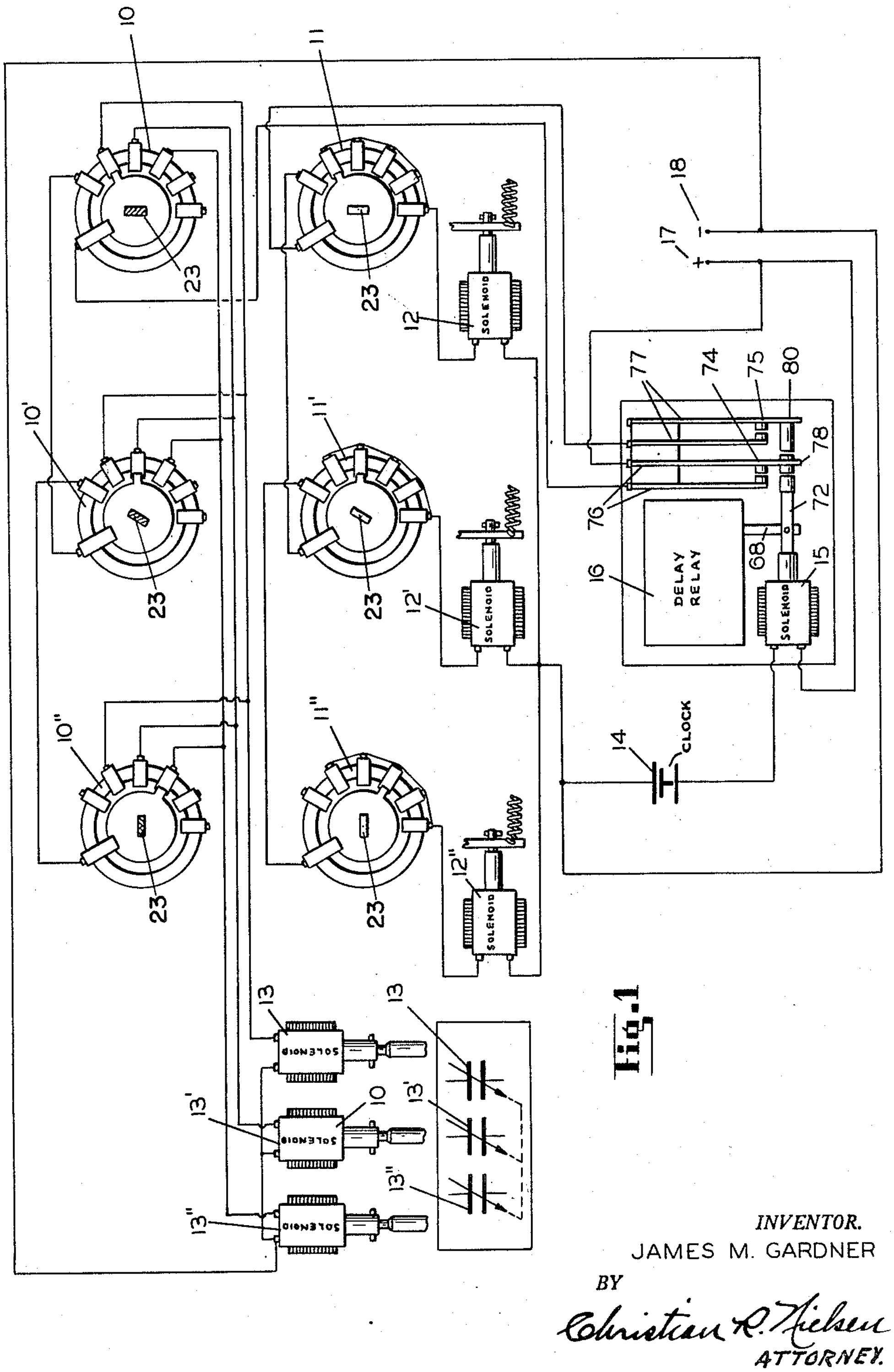
Figure 1 is a schematic diagram of the invention as a whole.

Referring in detail to the drawings and, for the present, to Figure 1 particularly, the invention comprises station selectors designated herein by numerals 10, 10', and 10'', multiple switches designated by numerals 11, 11', and 11'', each set on one of the selectors 10, 10', and 10'' respectively. Each multiple switch is connected to one of the solenoids represented by the numerals 12, 12' and 12'' with the switch 11 connected to solenoid 12, the switch 11' to the solenoid 12' and the switch 11'' to the solenoid 12''. A second group of solenoids designated by the numerals 13, 13' and 13'' are connected to the selectors 10, 10' and 10'', these solenoids in the second group are used for changing the radio condensers or stations. A time clock shown as 14, is adaptable for being set at stated time intervals, and is electrically connected to the solenoid 15, which in turn actuates a two-step relay-delay switch 16. A well known form of transformer not shown can be utilized and connected in the circuit in the usual manner, by leads designated as 17 and 18.

Figure 9:
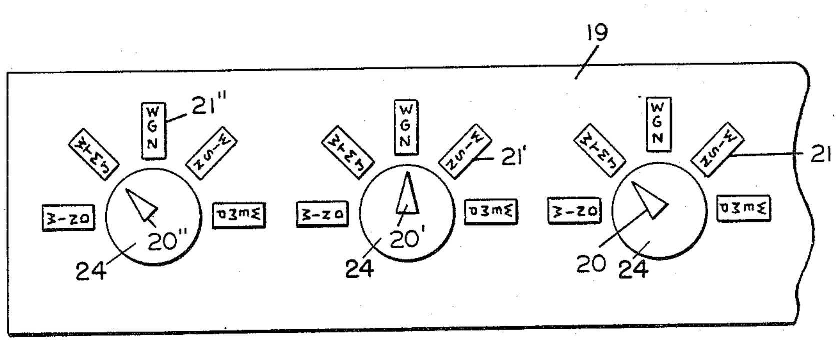
Figure 9 is a view of the panel showing the various stations arranged in order, around a plurality of station selectors.

Figure 9 designates a part of the panel 19 of a receiver, and is employed for mounting the selectors previously referred to by the numerals 10, 10' and 10'', and provided with station indicators 20, 20' and 20'' and having a plurality of radio sending station identifications 21, 21' and 21'', and designated by the station letters.

Figure 2:
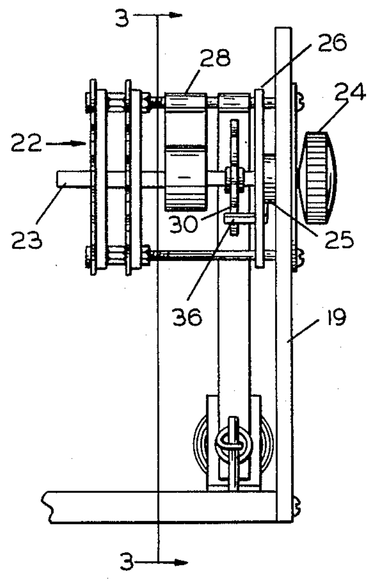
Figure 2 is a side elevation of the selector switch as used in the invention.
Figure 3:
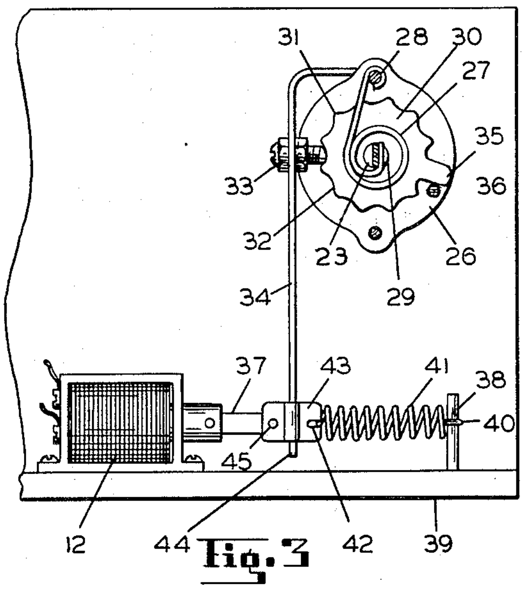
Figure 3 is a rear view of the selector switch of Figure 2 taken on line 3—3 of Figure 2.

The selector switch 22, as illustrated in Figure 2, includes a rectangular shaft 23 mounted in the panel 19, and has a knob 24 secured to one end thereof, the shaft 23 provides support for a collar 25, and a flat station selector disk 26. A coiled leaf spring 27 is secured at one end to a pin 28 secured adjacent the periphery of the disk 26, and the other end to the shaft 23 by means of a fastening element 29. Keyed to shaft 23 is a ratchet wheel 30 provided with teeth 31 around its periphery, and providing spaces 32 for temporary bearing surfaces for engaging the screw 33 which is secured to the rod 34. The engaging screw 33 engaging the ratchet wheel 30 in the spaces 32, to temporarily hold the switch in contact at the station selected. Extending outward from the periphery at the wheel 30, is a finger 35 which acts as a step for the selector switch 22. In operation, when a program has run its set time, the solenoid 12 will actuate the rod 37 longitudinally, thereby releasing the contact 33 from spaces 32, whereby the spring 27 releases the finger 35 to a home position. At the commencement of station selection, the finger 35 can be reset again. A support 38 may be secured in the chassis 39, and provides a means for retaining one end 40 of spring 41 having the other end 42 secured to the bracket 43, having an aperture for supporting one end 44 of rod 34. Incidently, the free end of rod 37 is fastened to one end of bracket 43 by any suitable fastening elements 45. The spring 41 provides tension for holding 33 against the ratchet wheel 30.

Figures 4, 5:
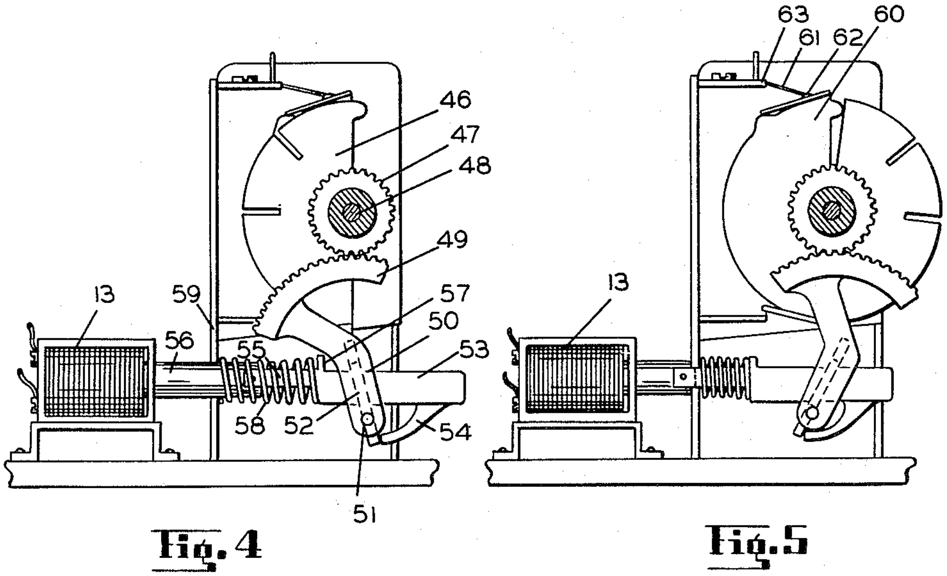
Figure 4 is a side elevation of the solenoid used for actuating a variable gang condenser.
Figure 5 is a view similar to Figure 4 with the solenoid and gang condenser in a different position.

Referring to Figure 4, the condensers shown as 46 are actuated through the medium of a gear 47 keyed to shaft 48 upon which the condensers 46 are mounted. A ratchet segment 49 and provided with an arm 50, meshes with the teeth on the gear 47. The arm 50 is rotatably mounted on a pin 51 which has one end fastened in the bracket 52, which in turn is secured to the rod 53. Depending from the free end of rod 53 is a curved finger 54, the end of which engages the free end of the bracket 52. Extending from one end of the rod 53, is a longitudinal portion 55 secured to the rod 56 which forms an operating arm having its free end movable in and actuated by a solenoid 13. The rod 53 is provided with a shoulder 57 for retaining one end of the spring 58, the other end of the spring 58 butts against condenser support 59. The back plate 60 of the condenser 46, is held firmly by a bracket 61 having one end secured to the condenser 46 by a fastening element 62 and the other end by a support 63. In operation, when the solenoid 13 is actuated, the rod 56 is pulled inwardly in to the solenoid 13, and the finger 54 butting against bracket 52 pushes the extension 50 rotatably around the pin 51 causing the segment 49 to turn the gear 47, causing the condenser to move from one position shown in Figure 4 to another position shown in Figure 5, against the tension of the spring 58.

The amount of movement of the condenser is controlled by a conventional push button selector mechanism (not shown) which has been pre-set for the desired station.

Figure 6:
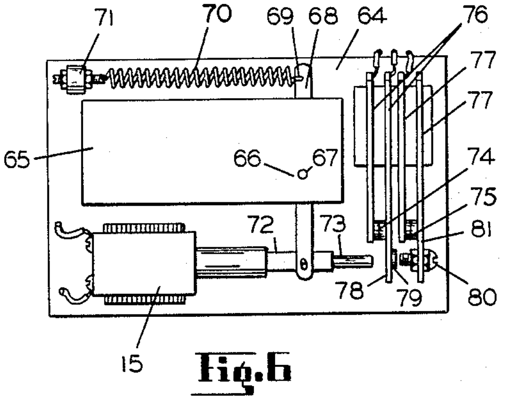
Figure 6 is a plan view of the relay-delay switch in retracted position, or in position where change in stations are to take place.

The relay delay switch shown in Figure 6 includes a support plate 64 having a plate 65 apertured at 66 for supporting a shaft 67 which rotatably mounts an arm 68. One end of the arm 68 provides means for holding an end 69 of a spring 70, the other end of the spring being secured in an adjustment 71, mounted on the plate 64. The other end of the arm 68 is pivoted on an arm 72 which is actuated by the solenoid 15. The arm 72 has a contact member 73 extending from its free end, for the purpose of breaking or making contact between the electrical contacts 74 and 75 which are mounted on blades 76 and 77 respectively. One of the blades 76 designated by the numeral 78, has a single contact 79 extending outward from its lower end and may be forced against a contact 80 depending from one of the blades 77 designated by the numeral 81.

Figure 7:
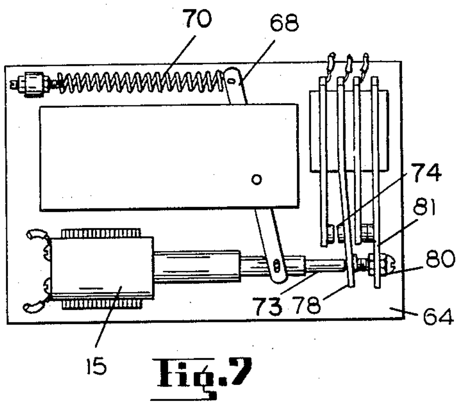
Figure 7 is a plan view similar to Figure 6 at a point where there is a pause to actuate the station selector to home position.

The position of the relay delay switch in Figure 6 is retracted and is in the position when one station has completed its set time program. The solenoid 15 when actuated provides a means whereby the member 73 contacts the blade 78 as illustrated in Figure 7, separating contacts 74 and making contact with 79 and 80. Attention is directed to the fact that contacts 75 are still engaged. This position in Figure 7 is the pause period. It is very slight and scarcely perceptible and just between the automatic change over from one station selector to the other. Almost immediately, the contacts 75 are separated as in Figure 8, and reception from the next station selector commences and the previous selection is in home position.

Figure 8:
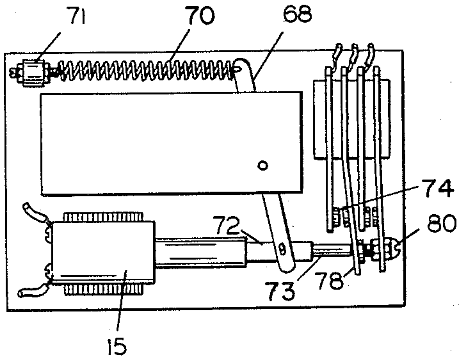
Figure 8 is the same switch shown in Figure 6 and is the normal position when reception from a station is being received.

During reception of a station and between the half-hour intervals, the relay delay switch remains in its normal position as shown in Figure 8 with contacts 74 and 75 open. Upon the clock mechanism reaching the half hour position, solenoid 15 is energized and rod 73 is retracted causing contacts 74 and 75 to close. Closure of contact 75 does not cause any reaction as a consequence of its closure due to the fact that no electrical path is completed by said closure since contacts 80—78 are open circuited and the electrical path from 17 (Figure 1) to blade 76—78 and to 80 is incomplete. But when contacts 74 engage, there is a closed electrical path (Figure 1) from 17 to inner blade 76 to contacts 74 to outer blade 76 to switch 10 to solenoid 13 and back to the negative end 18 of the power supply, thereby actuating solenoid 13 to drive the tuning mechanism. At this point, the time clock breaks contact and solenoid 15 is deenergized, causing rod 73 to be pushed forward by the swiveling action of 68 due to spring 70. In the first stage of the forward motion of 73 as shown in Figure 7, rod 73 drives 78 forward, opening contacts 74 and thereby deenergizing solenoid 13. Rod 73 continues to push 78 forward until contact 79 comes into contact with 80 thereby completing an electrical path (Figure 1) from 17 through blade 76—78, contacts 79—80, contacts 75 (which are still in engagement), inner blade 77, switch 11, solenoid 12, and back to the negative end 18 of the power supply. The completion of this electrical circuit energized solenoid 12 which actuates ratchet 30 to return to home position. The completion of this electrical path is only momentary since it occurs during the forward motion of rod 73 and occurs at a position intermediate the retracted and extended positions of rod 73. As rod 73 continues to move forward, blade 78, riding on rod 73, also moves forward pushing outer blade 77 forward thereby disengaging contacts 75 and breaking the energizing circuit for solenoid 12. Rod 73 continues forward to its furthermost extended position as shown in Figure 8, and remains in that position for the next half-hour.

It will be understood that the number of station selectors for which the apparatus is designed may be changed within wide limits, as well as other details of construction, without departing from the spirit of the invention or the scope of the appended claims.

Having thus described my invention, what I claim and desire to secure by letters patent of the United States is:

1. A device of the character described comprising, a plurality of selective tuning members, each tuning member equipped with a variable condenser and a solenoid for mechanically actuating said condenser, switches rotatably mounted in pairs, each pair of said switches connected electrically to the solenoids forming a part of said tuning members, each pair of said switches equipped with a solenoid for mechanically actuating said pair of switches, a relay delay switch equipped with a solenoid for mechanically actuating said relay delay switch, said relay delay switch electrically connected to one of said rotatably mounted pair of switches, each pair of said switches connected electrically to each of said other pair of switches, a time clock, said time clock electrically connected to said relay delay solenoid for periodically actuating said relay delay solenoid.

2. A device of the character described comprising, a time clock, a relay delay switch, said relay delay switch electrically connected to said time clock, a solenoid, said solenoid mechanically connected to said relay delay switch for actuating said relay delay switch, a plurality of switches rotatably mounted in pairs, a plurality of solenoids, each pair of said switches equipped with one of said solenoids and mechanically connected thereto, one of said pair of switches electrically connected to said relay delay switch and also electrically connected to each of the other of said switches, a plurality of selected tuning members consisting of, a variable condenser and solenoid for mechanically actuating said variable condenser, the solenoid of each of said tuning members electrically connected to each of said pair of rotatably mounted switches.

3. A device of the character described comprising, a time clock, a relay delay mechanism consisting of a plurality of electric contacts and a solenoid for mechanically actuating said mechanism, said time clock electrically connected to the solenoid in said relay delay mechanism, a plurality of switch mechanisms, said switch mechanisms consisting of a pair of switches and a solenoid for mechanically actuating the switches, one of said switch mechanisms electrically connected to said relay delay mechanism and to each of said other switch mechanisms, a plurality of selective tuning members consisting of a variable condenser and a solenoid for mechanically actuating said variable condenser, the solenoid in each of said selective tuning members connected to each of said switch mechanisms.

References Cited in the file of this patent

UNITED STATES PATENTS

| Number | Name | Date |
|---|---|---|
| 2,051,438 | Dwyer | Aug. 18, 1936 |
| 2,079,445 | Glass | May 4, 1937 |
| 2,332,767 | Wagner | Oct. 26, 1943 |
| 2,346,623 | Stewart et al. | Apr. 11, 1944 |
| 2,488,207 | Lea | Nov. 15, 1949 |
| 2,563,250 | Lacks | Aug. 7, 1951 |
| 2,574,097 | Foster | Nov. 6, 1951 |
| 2,582,039 | Jones | Jan. 8, 1952 |